(12) United States Patent
Lyons, Jr.

(10) Patent No.: US 10,106,998 B2
(45) Date of Patent: Oct. 23, 2018

(54) MULTI-USE ICRA BOOTH

(71) Applicant: Invent Teck LLC, Berrysburg, PA (US)

(72) Inventor: Kenneth Carl Lyons, Jr., Berrysburg, PA (US)

(73) Assignee: Invent Teck LLC, Berrysburg, PA (US)

( * ) Notice: Subject to any disclaimer, the term of this patent is extended or adjusted under 35 U.S.C. 154(b) by 0 days.

(21) Appl. No.: 15/617,437

(22) Filed: Jun. 8, 2017

(65) Prior Publication Data
US 2017/0356204 A1    Dec. 14, 2017

Related U.S. Application Data

(60) Provisional application No. 62/348,219, filed on Jun. 10, 2016.

(51) Int. Cl.
*E04H 1/12* (2006.01)
*E04B 1/343* (2006.01)
*B08B 15/02* (2006.01)

(52) U.S. Cl.
CPC ......... *E04H 1/1277* (2013.01); *E04B 1/3431* (2013.01); *E04B 1/34305* (2013.01); *E04H 1/1205* (2013.01); *B01D 2273/28* (2013.01); *B01D 2273/30* (2013.01); *B08B 15/02* (2013.01); *E04B 2001/34394* (2013.01); *E04H 1/125* (2013.01); *E04H 2001/1283* (2013.01)

(58) Field of Classification Search
CPC ......... E04H 15/48; E04H 15/46; E04H 15/10; E04H 1/125; E04H 1/1277; E04B 1/34305; E04B 1/34384; E04B 1/34357; E04B 1/344; E04B 1/82; B01D 2273/28; B01D 2273/30; B08B 15/02

USPC ............................................................ 52/67
See application file for complete search history.

(56) References Cited

U.S. PATENT DOCUMENTS

| | | | | |
|---|---|---|---|---|
| 3,774,955 A * | 11/1973 | Byer | ......................... | B60P 3/34 296/171 |
| 3,832,810 A * | 9/1974 | Johnston | .................. | E04L 32/74 52/67 |
| 4,223,967 A * | 9/1980 | Royer | .................. | A47B 81/002 312/204 |
| 4,682,448 A | 7/1987 | Healey | | |
| 4,732,592 A * | 3/1988 | Spengler | ................. | F24F 3/161 55/356 |
| 4,774,974 A * | 10/1988 | Teter | ..................... | B08B 15/026 134/110 |
| 4,883,512 A * | 11/1989 | Griffis | .................... | B01D 46/00 135/121 |

(Continued)

*Primary Examiner* — Beth A Stephan
(74) *Attorney, Agent, or Firm* — The Webb Law Firm

(57) ABSTRACT

A containment booth assembly includes a floor, a plurality of vertical sidewalls, and a plurality of sliding panels corresponding to each of the vertical sidewalls. The plurality of sliding panels define an extendible top portion, the extendible top portion extendible upwardly and configured to interface with a ceiling surface of a room above the containment booth assembly. In a non-limiting aspect or embodiment, one or more of the plurality of vertical sidewalls is rotatably mounted to vertical support beams and define an extendible side portion. The extendible side portion is extendible horizontally and configured to interface with a wall surface of the room beside the containment booth assembly.

20 Claims, 11 Drawing Sheets

(56) References Cited

U.S. PATENT DOCUMENTS

| | | | | |
|---|---|---|---|---|
| 4,934,396 | A * | 6/1990 | Vitta | E04H 1/1277 |
| | | | | 135/139 |
| RE33,810 | E * | 2/1992 | Strieter | B08B 15/026 |
| | | | | 134/104.4 |
| 5,154,469 | A * | 10/1992 | Morrow | B60P 3/34 |
| | | | | 296/171 |
| 5,379,466 | A * | 1/1995 | Davies | A47K 3/325 |
| | | | | 4/449 |
| 5,558,112 | A | 9/1996 | Strieter | |
| 5,832,676 | A * | 11/1998 | Gillmore | E04L 31/3431 |
| | | | | 248/654 |
| 6,383,242 | B1 | 5/2002 | Rogers et al. | |
| 6,966,937 | B2 * | 11/2005 | Yachi | A61G 10/005 |
| | | | | 128/205.26 |
| 7,134,444 | B2 * | 11/2006 | Mintie | B08B 15/00 |
| | | | | 135/131 |
| 7,147,553 | B2 * | 12/2006 | Leask | F24F 3/1607 |
| | | | | 454/230 |
| 7,188,636 | B1 | 3/2007 | Kanne et al. | |
| 7,347,472 | B2 * | 3/2008 | Pellegrin, Jr. | A61G 3/001 |
| | | | | 296/24.38 |
| 7,377,952 | B2 * | 5/2008 | Stout | B01D 46/42 |
| | | | | 312/1 |
| 7,448,945 | B2 | 11/2008 | Bessent | |
| 9,067,721 | B2 * | 6/2015 | Mullaney | E04L 31/3431 |
| 9,285,132 | B2 * | 3/2016 | Waulters | F24F 7/007 |
| 2014/0361580 | A1 * | 12/2014 | Flynn | B62D 35/001 |
| | | | | 296/180.3 |
| 2015/0292224 | A1 * | 10/2015 | Ginther | E04H 6/04 |
| | | | | 52/67 |

\* cited by examiner

MULTI-USE ICRA BOOTH

CROSS-REFERENCE TO RELATED APPLICATION

This application claims priority to U.S. Provisional Application No. 62/348,219, filed Jun. 10, 2016 and entitled "Multi-Use ICRA Booth", the disclosure of which is incorporated herein by reference in its entirety.

BACKGROUND OF THE INVENTION

Field of the Invention

The present invention relates to clean rooms or booths that may be used in accordance with Infection Control Risk Assessment (ICRA) procedures and protocols. More particularly, the present invention relates to mobile and modular clean rooms that interface with an area upon which work and cleaning will be undertaken, keeping the construction and cleaning work isolated from clean and/or sterile environments. The clean room or booth may be used in any sterile environment.

Description of Related Art

Infection Control Risk Assessment (ICRA) is a multidisciplinary, organizational, documented process that after considering the facility's patient population and program: focuses on reduction of risk from infection; acts through phases of facility planning, design, construction, renovation, and facility maintenance; and coordinates and weighs knowledge about infection, infectious agents, and care environment, permitting the organization to anticipate potential impact. The ICRA elements required for consideration are located in Chapter 1.5 of the 2006 AIA Guidelines. In the 2006 edition, the ICRA elements are divided into three areas: processes for design, construction, and mitigation.

Clean rooms and associated technology are well known in the art. Examples of prior mobile and/or modular containment booths or clean rooms include U.S. Pat. No. 7,448,945 to Bessent, U.S. Pat. No. 7,188,636 to Kanne et al., U.S. Pat. No. 6,383,242 to Rogers et al., and U.S. Pat. No. 4,682,448 to Healey.

U.S. Pat. No. 7,448,945 is directed to a mobile clean room having a frame mounted upon locking swivel wheels. The frame includes a door allowing for access to the interior of the booth and a ladder for accessing a ceiling.

U.S. Pat. No. 7,188,636 is directed to a portable containment cart enclosure that includes a frame assembly. The frame assembly is supported on wheels and is extendible to engage a ceiling.

U.S. Pat. No. 6,383,242 is directed to a mobile enclosure unit that includes a vertical, wheeled frame assembly having an open upper end and a lower wall. The frame assembly is disposed on wheels for portability. The frame assembly is adjustable in height so that the upper end can be positioned in contact with a ceiling to allow access for workers to work on or in the ceiling.

U.S. Pat. No. 4,682,448 is directed to a shelter that defines an enclosure extending from the floor of an area to the ceiling and provides access through a ceiling opening for above-ceiling construction and repair.

The above-discussed prior art carts or containment booths are all limited in length and, as such, cannot be used with materials having a length longer than 7 feet, and maintain complete containment of the space within the booth or cart with negative air flow. These carts or containment booths also lack the ability to be connected to a wall surface.

SUMMARY OF THE INVENTION

Aspects and embodiments of the present invention relate to a containment booth assembly including a floor, a plurality of vertical sidewalls, and a plurality of sliding panels corresponding to each of the vertical sidewalls. The plurality of sliding panels define an extendible top portion, the extendible top portion extendible upwardly and configured to interface with a ceiling surface of a room above the containment booth assembly.

In a non-limiting aspect or embodiment, one or more of the plurality of vertical sidewalls is rotatably mounted to vertical support beams and defines an extendible side portion. The extendible side portion is extendible horizontally and configured to interface with a wall surface of the room beside the containment booth assembly.

In another non-limiting aspect or embodiment, the containment booth assembly further includes a fan adapted to supply a negative pressure to the containment booth assembly and draw contaminants from the containment booth assembly through a filter.

In another non-limiting aspect or embodiment, the fan and the filter are disposed in one of the plurality of vertical sidewalls.

In another non-limiting aspect or embodiment, the extendible side portion includes a pair of opposing bifold panels, each including a primary panel and secondary panel hingedly connected to the primary panel. The extendible side portion is arrangeable in a retracted position in which the primary panel and the secondary panel of each bifold panel are folded against each other. The extendible side portion is further arrangeable in a partially extended position in which the primary panel and the secondary panel of each bifold panel are unfolded perpendicular to each other to define a partially extended footprint of the containment booth assembly. The extendible side portion is further arrangeable in a fully extended position in which the primary panel and the secondary panel of each bifold panel are unfolded parallel to each other and define a fully extended footprint of the containment booth assembly when both secondary panels interface with the wall surface.

In another non-limiting aspect or embodiment, each of the plurality of sliding panels is connected to the corresponding vertical sidewall via one or more constant force springs, the constant force springs biasing the sliding panel in a vertical direction Other aspects and embodiments of the present invention relate to a containment booth assembly including a primary booth including a floor, a plurality of vertical sidewalls, and a plurality of sliding panels corresponding to each of the vertical sidewalls; and a secondary booth connectable to the primary booth, the secondary booth including a floor, a plurality of vertical sidewalls, and a plurality of sliding panels corresponding to each of the vertical sidewalls. The plurality of sliding panels of the primary booth and the secondary booth define an extendible top portion. The extendible top portion is extendible upwardly and is configured to interface with a ceiling surface of a room above the containment booth assembly.

In a non-limiting aspect or embodiment, one or more of the plurality of vertical sidewalls of the primary booth and/or the secondary booth are rotatably mounted to vertical support beams and define an extendible side portion. The extendible side portion is extendible horizontally and configured to interface with a wall surface of the room beside the containment booth assembly.

In another non-limiting aspect or embodiment, the containment booth assembly further includes a fan adapted to supply a negative pressure to the containment booth assembly and draw contaminants from the containment booth assembly through a filter.

In another non-limiting aspect or embodiment, the fan and the filter are disposed in one of the plurality of vertical sidewalls of the primary booth or the secondary booth.

In another non-limiting aspect or embodiment, the extendible side portion includes a pair of opposing bifold panels, each including a primary panel and secondary panel hingedly connected to the primary panel. The extendible side portion is arrangeable in a retracted position in which the primary panel and the secondary panel of each bifold panel are folded against each other. The extendible side portion is further arrangeable in a partially extended position in which the primary panel and the secondary panel of each bifold panel are unfolded perpendicular to each other to define a partially extended footprint of the containment booth assembly. The extendible side portion is further arrangeable in a fully extended position in which the primary panel and the secondary panel of each bifold panel are unfolded parallel to each other and define a fully extended footprint of the containment booth assembly when both secondary panels interface with the wall surface.

In another non-limiting aspect or embodiment, each of the plurality of sliding panels is connected to the corresponding vertical sidewall via one or more constant force springs, the constant force springs biasing the sliding panel in a vertical direction.

The present invention also relates to a method of establishing a containment area in a room, the method including providing a containment booth assembly including a floor, a plurality of vertical sidewalls, and a plurality of sliding panels corresponding to each of the vertical sidewalls. The plurality of sliding panels defines an extendible top portion. The method further includes positioning the containment booth assembly in a desired position in the room and extending the extendible top portion of the containment booth assembly upwardly to interface with a ceiling structure of the room above the containment booth assembly.

In a non-limiting aspect or embodiment, the method further includes extending an extendible side portion of the containment booth assembly horizontally to interface with a wall surface of the room located behind the primary booth.

In another non-limiting aspect or embodiment, the method further includes applying a negative pressure through a filter to the containment booth assembly, the negative pressure drawing contaminants from within the containment booth assembly to the filter, preventing the contaminants from entering the room.

DETAILED DESCRIPTION OF THE INVENTION

Figure 1:
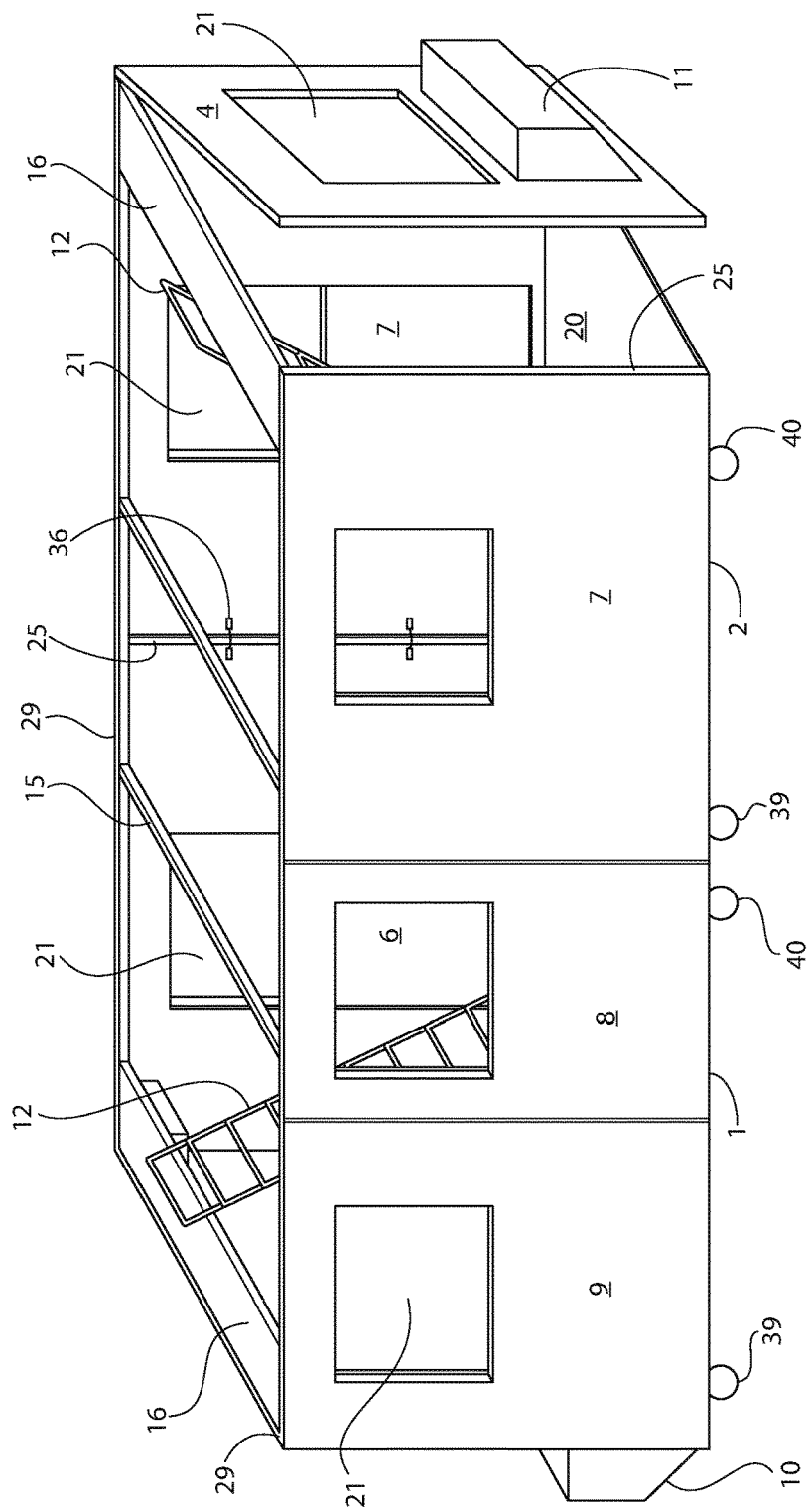
FIG. 1 is a perspective view of a containment booth assembly according to the principles of the present invention.

For purposes of the description hereinafter, the terms "end", "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting. In the accompanying drawings, like reference numerals refer to like components unless otherwise noted to the contrary.

Figure 2:
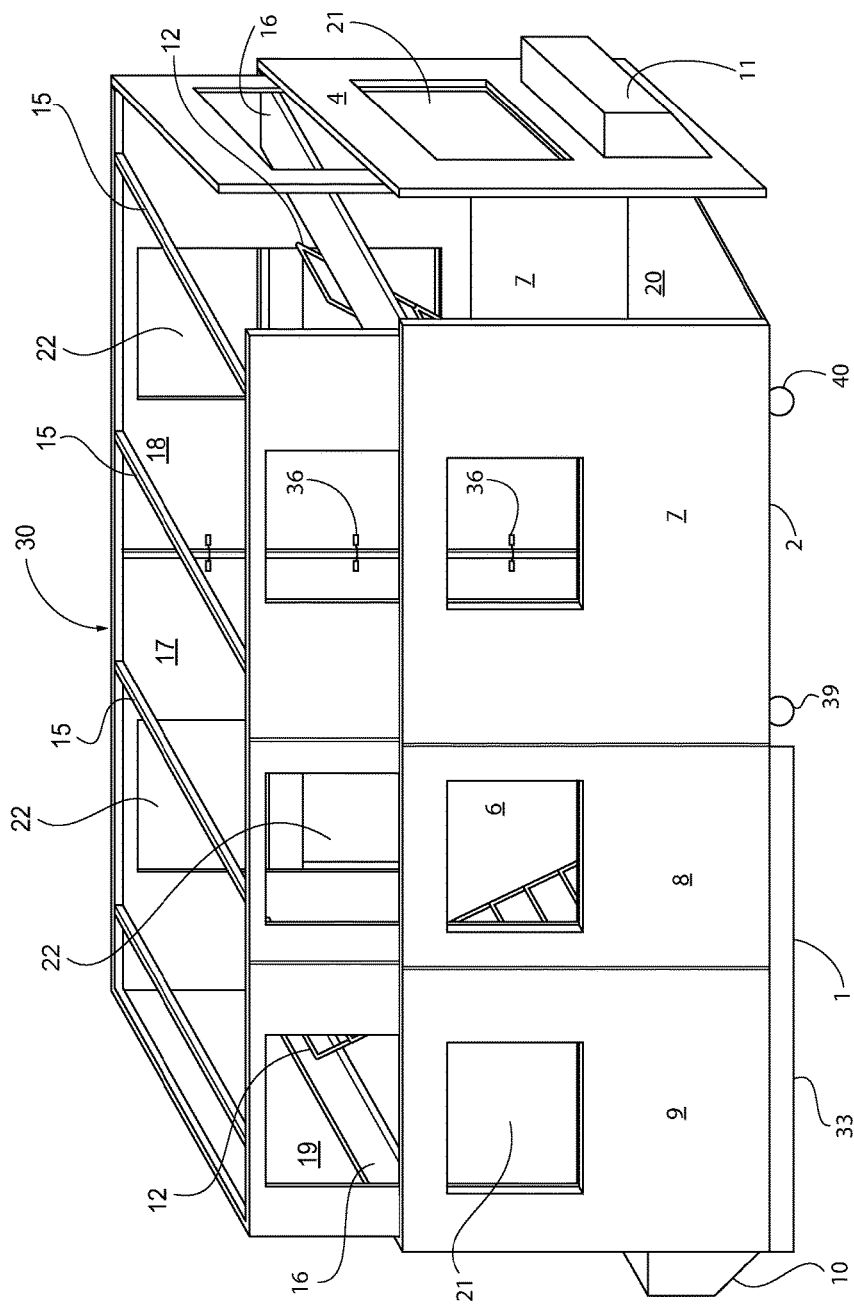
FIG. 2 is a perspective view of the containment booth assembly of FIG. 1 with an extendible top portion in a raised position.
Figure 11:
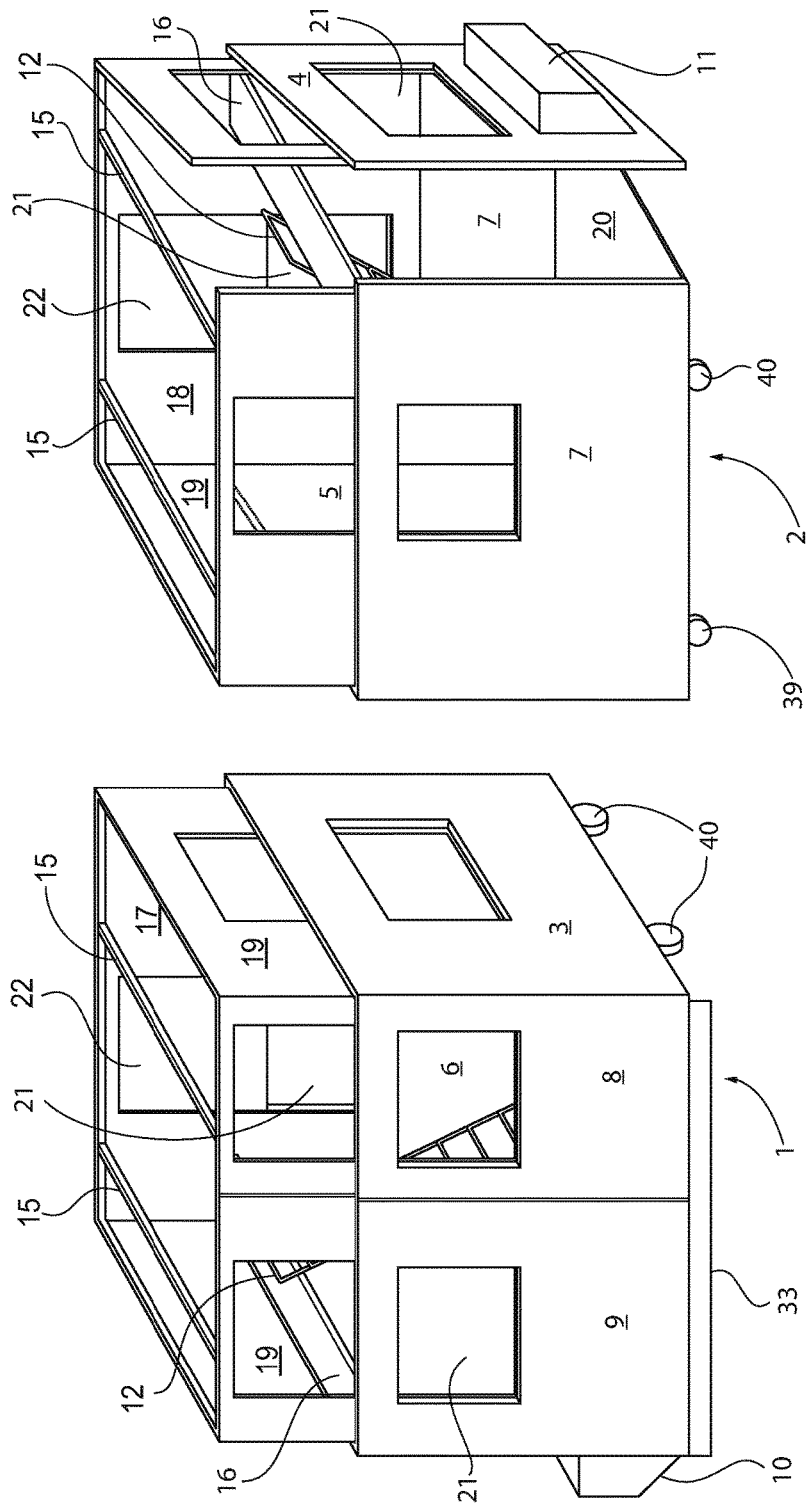
FIG. 11 is a perspective view of a primary booth and a secondary booth arranged in a standalone configuration.

Referring now to FIGS. 1, 2 and 11, a multi-use Infection Control Risk Assessment (ICRA) containment booth assembly is shown in accordance with the principles of the present invention. The ICRA containment booth assembly includes a primary booth 1 and a secondary booth 2 of similar construction. The primary booth 1 and the secondary booth 2 are adapted to be used either connected to one another as shown in FIGS. 1-2, or as standalone booths as shown in FIG. 11. The primary booth 1 and secondary booth 2 define a partially enclosed work area moveable within a room of a building. The partially enclosed work area allows workers to perform maintenance, repairs, and upgrades on desired sections of the room while isolating the rest of the room from contaminants produced by the workers' activities. The primary booth 1 and secondary booth 2 are each generally rectilinear in shape, including a plurality of vertical sidewalls extending upwards from a floor 20. The vertical sidewalls may be made of a rigid material, such as aluminum sheet. The floor 20 may be made from any strong, skid-resistant material, such as aluminum diamond plate, capable of supporting workers and various equipment.

A plurality of wheels or casters is affixed to the underside of each floor 20 to facilitate transport of the booths 1, 2. Preferably, each of the primary booth 1 and secondary booth 2 includes a pair of fixed wheels 39 and a pair of swivel and locking wheels 40. This configuration of fixed wheels 39 and swivel and locking wheels 40 provides for efficient transport of the booths 1, 2, and allows the booths 1, 2 to be locked into a desired position when a locking mechanism of the swivel and locking wheels 40 is activated. The fixed wheels 39 and swivel and locking wheels 40 may also be removable.

Referring now to the configuration shown in FIGS. 1-2, each of the primary booth 1 and secondary booth 2 is enclosed on three of the four vertical sides extending upward from the floor. The fourth vertical side of each of the primary booth 1 and secondary booth 2 is openable such that the booths 1, 2 may be joined at their respective open sides to define a continuous work area. A plurality of connection latches 36 is provided on the vertical sides of at least one of the primary booth 1 and the secondary booth 2 to join the booths 1, 2 together. Each connection latch 36 may be a draw latch having a latching handle affixed to one of the primary booth 1 and the secondary booth 2 or a corresponding hook affixed to the other of the primary booth 1 and the secondary booth 2. Further, each connection latch 36 may include tension springs to tightly draw the primary booth 1 and the secondary booth 2 together and to better withstand vibratory loads applied during use of the containment booth assembly. In this manner, the booths 1, 2 may joined together via the latch connections 36 when in use, and the booths 1, 2 may be unlatched so that they may be transported individually.

As noted above, each of the primary booth 1 and secondary booth 2 includes vertical sidewalls on three of the four vertical sides. In particular, as can be appreciated from the embodiment shown in FIGS. 1-3, the primary booth 1 includes a fixed wall 6, an end wall 14, and an extendible side portion. The extendible side portion includes opposing sets of bifold panels, each including a primary panel 8 and a secondary panel 9. The fixed wall 6, the end wall 14, and the extendible side portion define the three vertical sides of the primary booth 1. A door 3 is hingedly connected to the fixed wall 6 and may include a spring latch for securing the door in both the opened or closed positions. In the opened position, as shown in FIG. 1, the door 3 is latched to the adjacent fixed wall 6 to provide a continuous work area between the booths 1, 2. In the closed position, as shown in FIG. 11, the door 3 defines a fourth vertical wall such that the primary booth 1 is enclosed on all four sides. As may be appreciated from FIG. 11, the door 3 allows for ingress and egress to and from the primary booth when the primary booth 1 is used in a standalone configuration.

A primary high-efficiency particulate air (HEPA) fan 10 is disposed in the end wall 14 to apply a negative pressure inside of the primary booth 1. In addition, the HEPA fan 10 filters air withdrawn from the primary booth 1 to prevent contaminants and particulate matter generated inside the primary booth 1 from escaping to the outside environment.

Figure 3:
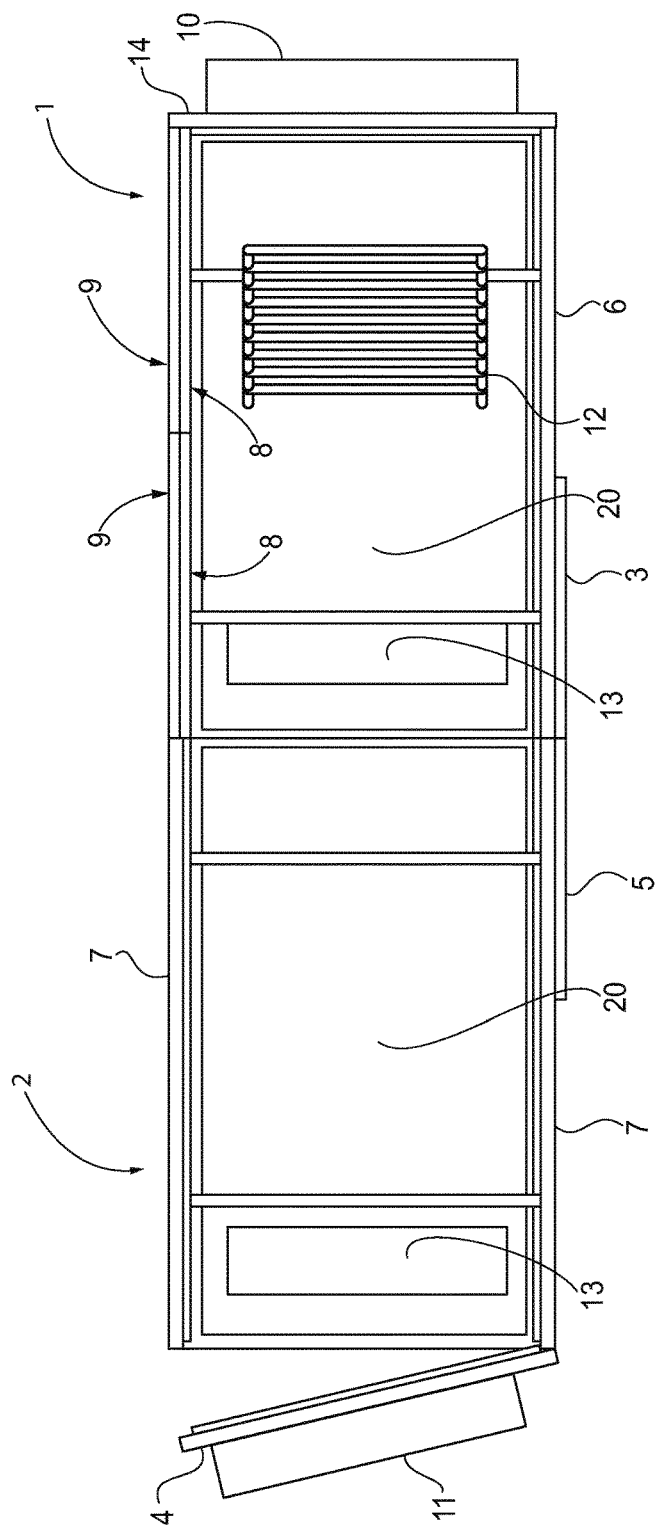
FIG. 3 is a top view of the containment booth assembly of FIG. 1 with an extendible side portion in a retracted position.

The secondary booth 2 shown in the embodiment of FIGS. 1-3 includes two fixed walls 7 on opposite sides of the secondary booth 2 and a fan door 4 adjacent to both fixed walls 7. The fan door 4 allows for ingress and egress to and from the inside of the secondary booth 2, and includes an integral secondary HEPA fan 11 to supplement the primary HEPA fan 10. A second door 5, similar to the door 3 of the primary booth 1, is hingedly connected to one of the fixed walls 7 to provide an additional location for ingress and egress when the secondary booth 2 is used in a standalone configuration, as shown in FIG. 11.

Figure 6:
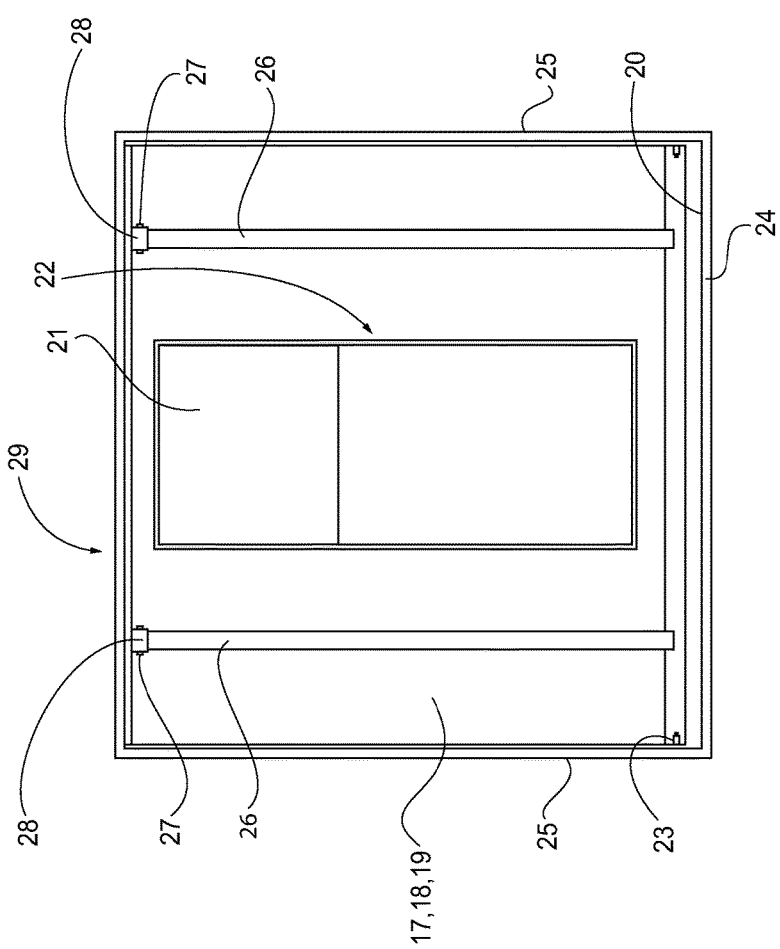
FIG. 6 is a side view of a vertical sidewall of the containment booth assembly of FIG. 1 with a sliding panel in a lowered position.
Figure 7:
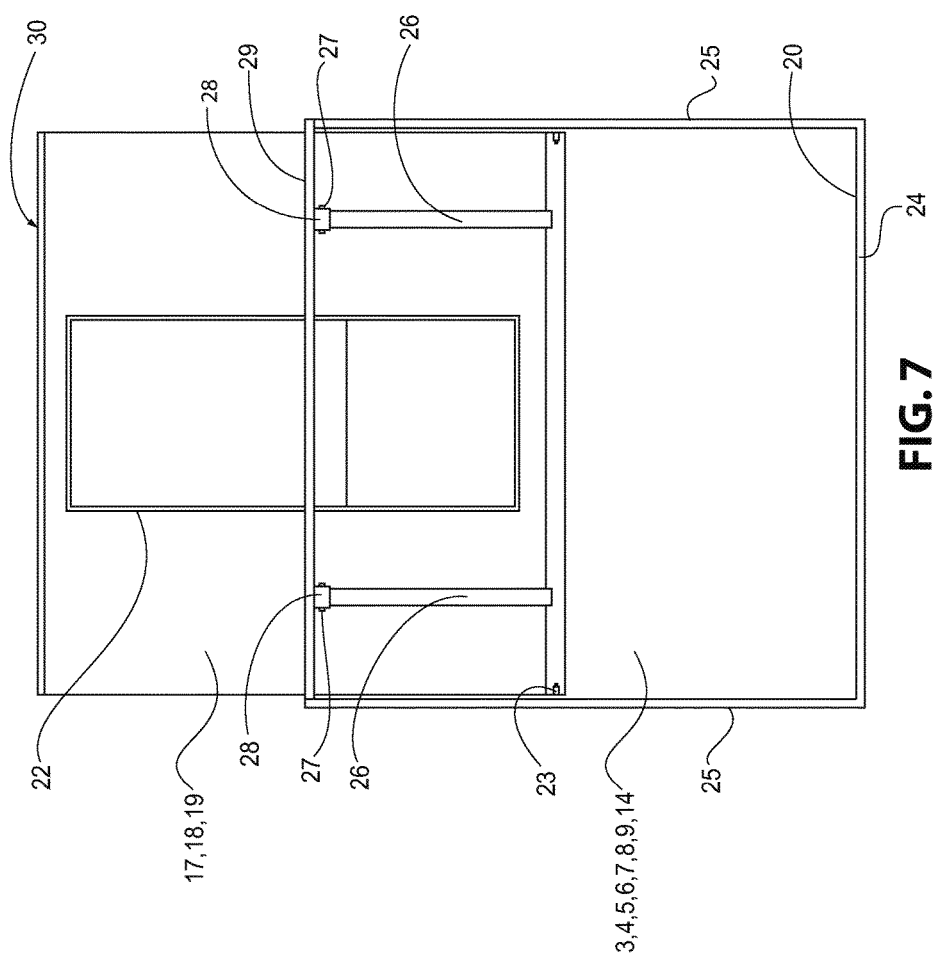
FIG. 7 is a side view of the vertical sidewall of FIG. 6 with the sliding panel in a raised position.

The fixed wall 6 and the end wall 14 of the primary booth 1 and the fixed walls 7 of the secondary booth 2 may include a support structure to provide additional strength and rigidity to the fixed walls 6, 7 and the fixed end wall 14, as may be appreciated from FIGS. 6-7. In particular, the primary booth 1 and the secondary booth 2 may include a plurality of vertical support beams 25 rigidly connected to the floor 20 and vertical edges of the fixed walls 6, 7 and fixed end wall 14. Adjacent sides of each booth 1, 2 share one of the vertical support beams 25. For example, the fixed wall 6 and the fixed end wall 14 of the primary booth 1 share one of the vertical support beams 25 where the fixed wall 6 and the fixed end wall 14 meet at a corner of the primary booth 1. The plurality of vertical support beams 25 may be connected to the floor 20, the fixed walls 6, 7, and the end wall 14 by welds, rivets, or other suitable fastening means.

With continued reference to FIGS. 6-7, the primary booth 1 and secondary booth 2 may further include a plurality of fixed body supports 24 each extending between adjacent vertical support beams 25 to provide additional strength and rigidity to the booths 1, 2. Each of the plurality of fixed body supports 24 is rigidly connected at each end to one of the vertical support beams 25 and extends substantially parallel to the floor 20. Similarly, the primary booth 1 and secondary booth 2 may further include a plurality of upper beam supports 29 each extending between and rigidly connected to adjacent vertical support beams 25.

The vertical support beams 25, fixed body supports 24, and upper beam supports 29 are preferably made of the same material as the floor 20 frame system, fixed walls 6, 7, and fixed end wall 14, such as aluminum. In addition to providing strength and rigidity to the booths 1, 2, the vertical support beams 25, fixed body supports 24, and upper beam supports 29 may also be used as mounting locations for other components of the containment booth assembly discussed hereinafter.

It is to be understood that the embodiments shown in the accompanying drawings are exemplary and represent merely one possible configuration of the primary booth 1 and the secondary booth 2. Other arrangements and configurations of the fixed walls 6, 7, end wall 14, extendible side portion, and doors 3, 4, 5 will be readily apparent to those skilled in the art, and may be implemented based on the principles of the present disclosure.

Figure 8:
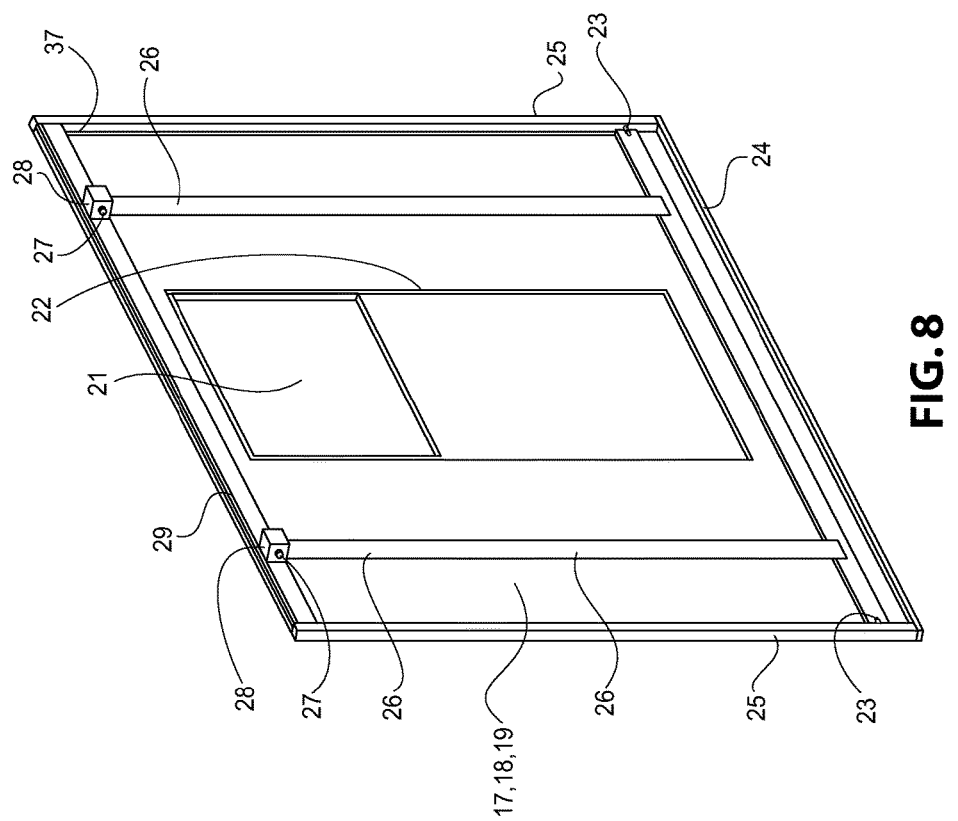
FIG. 8 is a perspective view of the vertical sidewall of FIG. 6.

Referring back to FIGS. 1 and 2, each of the primary booth 1 and secondary booth 2 may further include an extendible upper portion which may be raised and lowered to interface with a ceiling structure above the primary booth 1 and secondary booth 2. FIG. 1 shows the extendible upper portion in a lowered position within the primary booth 1 and secondary booth 2. FIG. 2 shows the extendible upper portion in a raised position for interfacing with a ceiling surface of a room. The extendible upper portion is further adjustable to any position between the lowered position and raised position as desired, depending on the height of the ceiling surface of the room. The extendible upper portion includes a plurality of sliding panels 17, 18, 19, each sliding panel 17, 18, 19 slidably mounted to the inside of a corresponding vertical sidewall of the primary booth 1 or secondary booth 2. For example, a sliding panel 17 corresponds to the fixed wall 6 of the primary booth 1, an end wall sliding panel 19 corresponds to the end wall 14 of the primary booth 1, and a secondary sliding panel 18 corresponds to the fixed wall 7 of the secondary booth 2. Additional sliding panels 17, 18, 19 correspond to the doors 3, 4, 5 and bifold panels 8, 9, such that all vertical sidewalls of the booths 1, 2 are upwardly extendible. As shown in FIGS. 6-8, each sliding panel 17, 18, 19 of the extendible upper portion is slidably mounted to its corresponding wall 6, 7, 14, door 3, 4, 5, or bifold panel 8, 9 via a panel guide 37 mounted to or integral with adjacent vertical support beams 25. Each panel guide 37 is a channel which engages vertical edges of the adjacent sliding panel 17,18, 19, permitting vertical motion of the sliding panel 17, 18, 19, but prohibiting lateral or horizontal motion. Each sliding panel 17, 18, 19 further includes a gasket 30 disposed on a top surface of the sliding panel 17, 18, 19. The gasket 30, which may be made of foam or a similar resilient material, creates an isolating seal between the containment booth assembly and the outside environment of the room when the extendible top portion is interfaced with the ceiling surface of the room. In this manner, contaminants are contained within the containment booth assembly so that the remainder of the room may remain in use while maintenance, repairs, or upgrades are performed on the portion of the room isolated by the containment booth assembly.

As shown in FIGS. 1, 2, 6, 7, and 8, each sliding panel 17, 18, 19 of the extendible upper portion includes an oversized sliding window 22 corresponding to a lower window 21 of the primary booth 1 or secondary booth 2. The sliding window 22 has a height greater than the corresponding lower window 21 such that the lower window 21 is not obstructed when the extendible upper portion is raised and lowered. As can be appreciated from FIGS. 1 and 2, the oversized sliding windows 22 do not obstruct the lower windows 21 regardless of whether the extendible upper portion is in the raised position or the lowered position.

Figure 4:
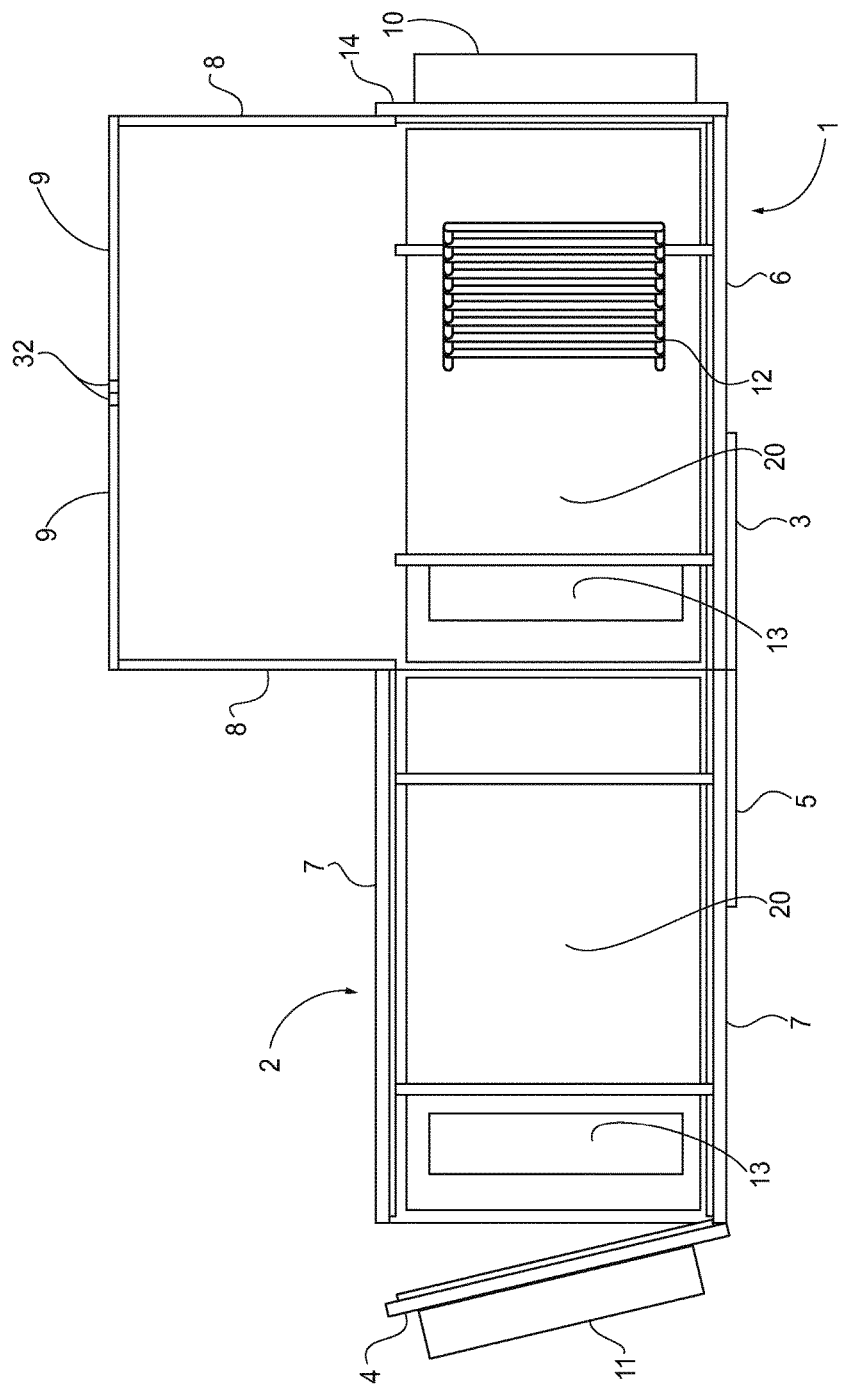
FIG. 4 is a top view of the containment booth assembly of FIG. 1 with an extendible side portion in a partially extended position.
Figure 5:
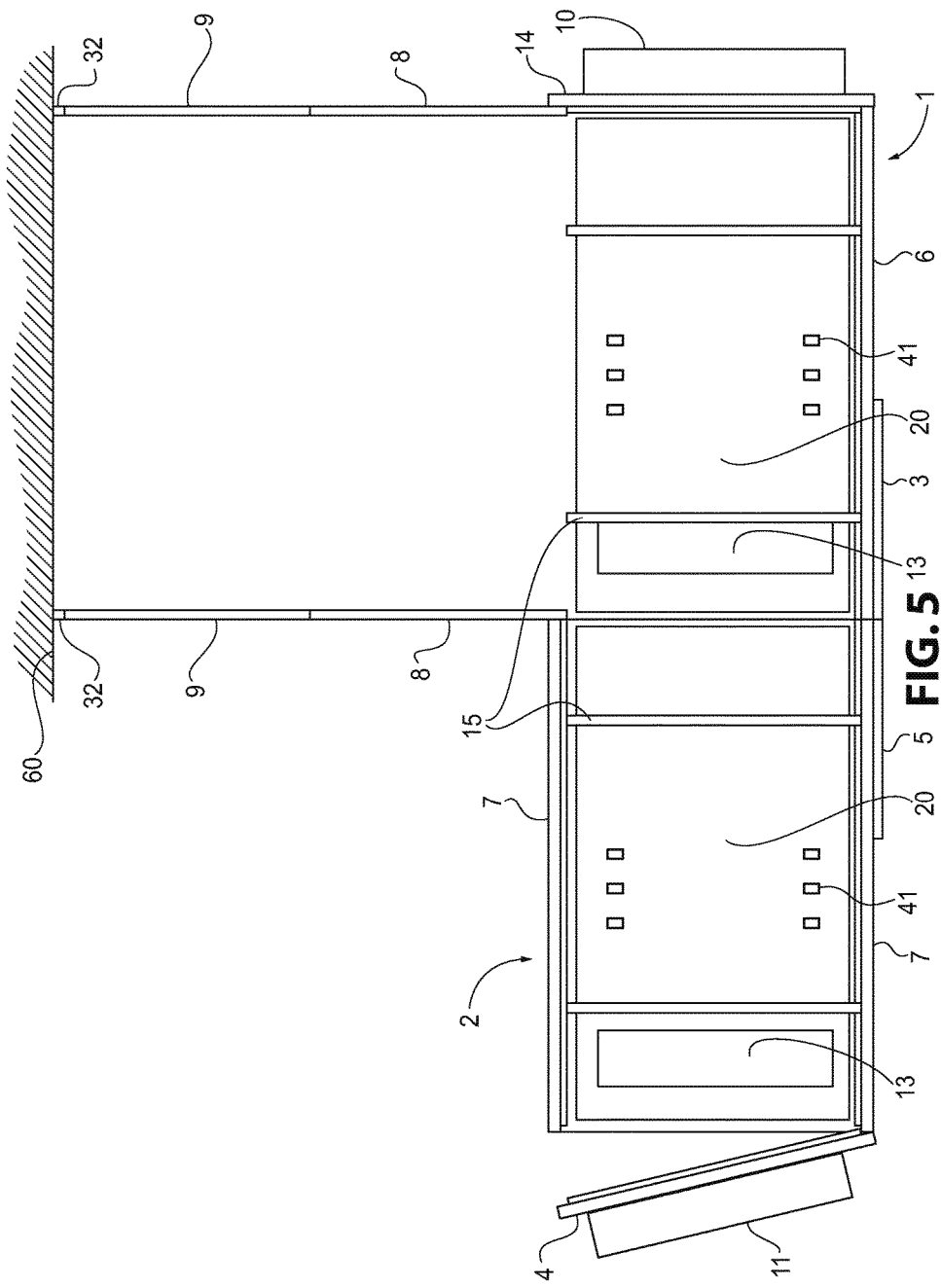
FIG. 5 is a top view of the containment booth assembly of FIG. 1 with an extendible side portion in a fully extended position.

Now referring to FIGS. 3-5, each of the primary booth 1 and secondary booth 2 may include an extendible side portion that allows the footprint of the booth 1, 2 to be expanded, and allows the booth 1, 2 to interface with a building wall surface of a room to the side of the primary or the secondary booth 1, 2. FIGS. 3-5 show only the primary booth 1 having an extendible side portion, but the secondary booth 2 could also be equipped with an extendible side portion if desired. The extendible side portion generally includes a pair of bifold panels mounted to hinges on adjacent vertical support beams 25 of the primary booth 1 or the secondary booth 2. Each bifold panel includes a primary panel 8 and a secondary panel 9 connected by a hinged joint. Referring back to FIG. 2, a removeable skirt gasket 33 extends from the base of each bifold panel to a floor of the room to isolate the booths 1, 2 from the outside environment of the room when the extendible side portion is extended.

As illustrated in FIGS. 3-5, the extendible side portion is usable in three positions. FIG. 3 illustrates a retracted position of the extendible side portion in which the extendible side portion is closed for transport of the booth, or for performing work within the booth where interfacing with a wall surface is not desired. In the retracted position, the primary panel 8 and secondary panel 9 of each bifold panel are folded against each other, and each bifold panel is rotated inwardly to form a continuous wall panel spanning from the adjacent vertical members of the primary booth 1.

FIG. 4 illustrates a partially extended position in which the extendible side portion is used to increase the footprint of the primary booth 1. In the partially extended position, the primary panels 8 are opened outwardly from and perpendicular to the primary booth 1. The secondary panels 9 are then opened inwardly and perpendicular to the primary panels 8, such that distal ends of the secondary panels 9 interface with each other to define an extended footprint of the primary booth 1. A gasket 32 is provided on the distal end of each secondary panel 9 to provide an isolating seal between the abutting secondary panels 9.

FIG. 5 illustrates a fully extended position in which the extendible side portion is opened and interfaces with a building wall surface such that work may be performed on a building wall surface 60 from inside the booth. In the fully extended position, the primary and secondary panels 8, 9 of each bifold panel are opened perpendicular to the primary booth 1. The booth is positioned such that the distal end of each secondary panel 9 abuts the building wall surface. The fully extended position thus increases the footprint of the primary booth 1 relative to the partially extended position. The gasket 32 on the distal end of each secondary panel 9 provides an isolating seal between the booth and the building wall surface 60. The gasket 32 may be made from a flexible foam material such that it can contour to any projections from the building wall surface 60, such as a railing, thereby maintaining an isolated seal between the building wall surface 60 and the primary booth 1. Additionally, tension clips may be affixed to the distal end of each secondary panel 9 to secure the secondary panels 9 to the building wall surface 60. Thus, in the fully extended position, work may be performed from within the primary booth 1 on the section of the building wall surface between the two secondary panels 9 without risking contamination of the surrounding room with dust, debris, welding sparks, and other contaminants.

Referring now to FIGS. 6-8, the extendible top portion may be raised and lowered relative to the floor 20 by manually lifting the sliding panels 17, 18, 19 within adjacent panel guides 37. A sliding gasket may be disposed between each panel guide 37 and the corresponding vertical edge of the sliding panels 17, 18, 19. To assist workers in lifting the extendible top portion to the raised position, a plurality of constant force springs 26 are attached between each sidewall 3, 4, 5, 6, 7, 8, 9, 14 and its corresponding sliding panel 17, 18, 19 to bias the sliding panels 17, 18, 19 in the vertical direction. Each constant force spring 26 includes a metal strip having a coiled portion which can be unrolled by applying sufficient force to a free end. The coiled portion of each constant force spring 26 is rotatably mounted to a corresponding upper beam support 29 via a coil spring support 27. The coil spring support 27 extends parallel to the axis of the coiled portion, such that the constant force spring 26 may rotate around coil spring support 27 as the constant force spring 26 winds or unwinds. The coiled portion is partially unwound and the free end is secured to a base of the corresponding sliding panel 17, 18, 19, such that a tension force created by the constant force spring 26 attempting to return to a wound state tends to counteract the weight of the corresponding sliding panel 17, 18, 19. Thus, the worker can apply a lifting force less than the weight of the sliding panels 17, 18, 19 to raise the sliding panels 17, 18, 19.

When each sliding panel 17, 18, 19 is raised to a desired height, the sliding panels 17, 18, 19 may be locked into place relative to the sidewall 3, 4, 5, 6, 7, 8, 9, 14 by one or more latching devices. In particular, a plunger latch 23 may be mounted near the vertical edges of each sliding panel 17, 18, 19. Each plunger latch 23 is engageable to apply a force onto the corresponding channel guide 37 to keep the corresponding sliding panel 17, 18, 19 in a desired vertical position. In this manner, the extendible top portion may be adjusted to a desired height.

Each constant force spring 26 is protected from damage by a corresponding spring guard 28 mounted to the sliding panel 17, 18, 19 parallel to an unwound portion of the constant force spring 26. Each spring guard 28 may be a flat bar or channel that prevents workers, tools, and materials from contacting the constant force spring 26 while moving or being moved within the booths 1, 2.

As may be appreciated from the accompanying drawings, the primary booth 1 and the secondary booth 2 may include a variety of features adapted for specific intended uses of the containment booth assembly. Referring again to FIGS. 1, 3 and 4, one or more removable shelf and ladder supports 16 may be mounted to upper support beams 29 of the primary booth 1 and/or the secondary booth 2. The removable shelf and ladder rack 16 provides both a platform for storage and a support for leaning a ladder 12 against. Preferably, the ladder 12 may have expandable or telescoping legs which are particularly well-suited for use in the limited work area inside the containment booth assembly.

Referring again to FIG. 5, a plurality of ladder support notches 41 may be cut into the floor 20 to receive the feet of the ladder 12 at various positions within the containment booth assembly. The ladder support notches 41 provide safe footholds such that the ladder is prevented from shifting or tipping over during use.

Referring again to FIG. 3, the primary booth 1 and/or the secondary booth 2 may include a sticky walk-off mat 13 to clean debris from workers' shoes before leaving either of the booths 1, 2.

Figure 9:
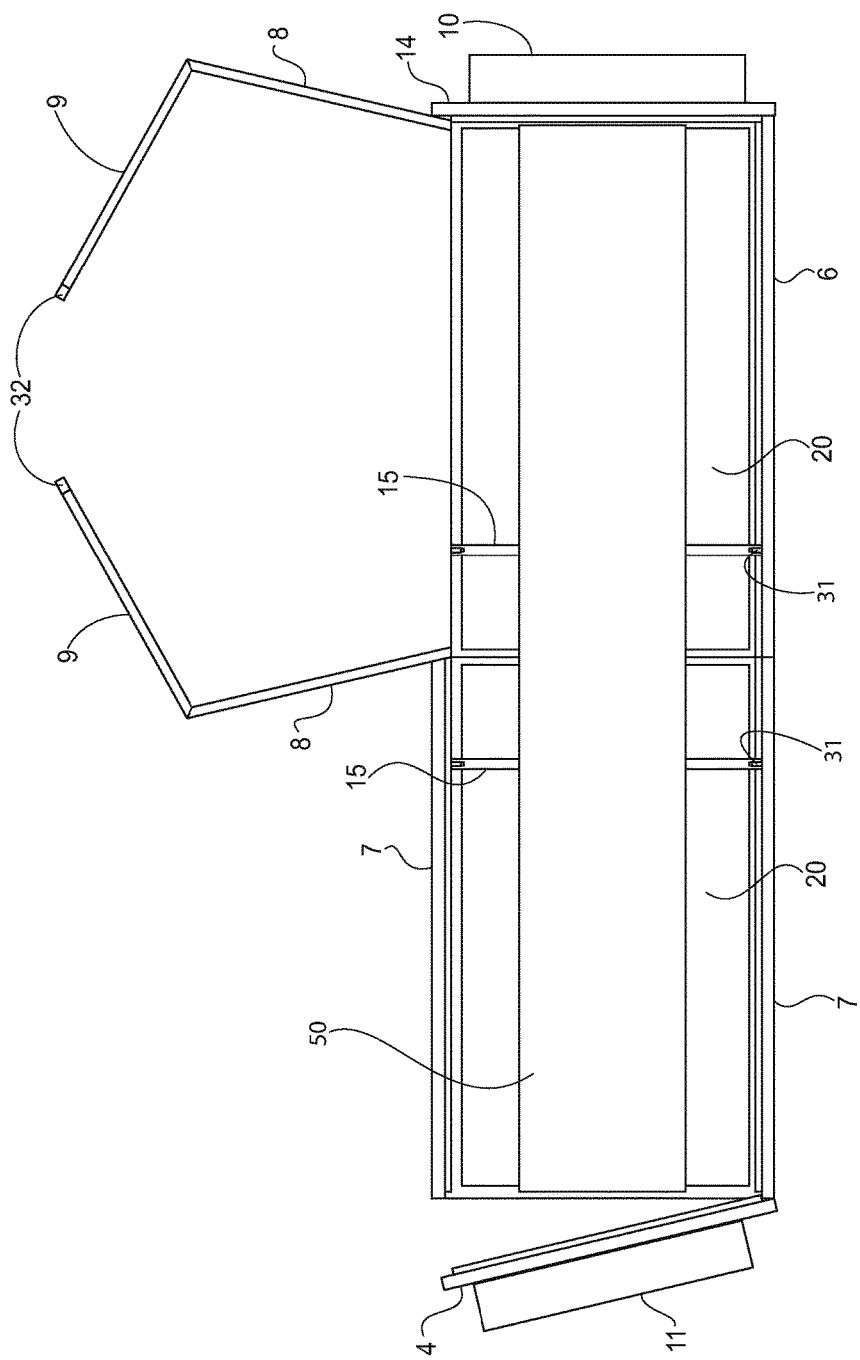
FIG. 9 is a top view of the containment booth assembly of FIG. 1 showing additional features of the containment booth assembly.

Referring now to FIG. 9, the primary booth 1 and the secondary booth 2 may include one or more removable cross bar supports 15 spanning orthogonally from the upper support beams 29 of the fixed wall 6 to the top of the extendible side portion. Similarly, the secondary booth 2 may include one or more cross bar supports 15 spanning between the upper support beams 29 of the opposing fixed walls 7. The cross bar supports 15 provide additional structural stability to the primary booth 1 and the secondary booth 2. Each removable cross bar support 15 includes a spring-biased snap pin 31 on each end for connecting with the upper support beams 29 of the primary booth 1 and secondary booth 2. For this purpose, the upper support beams 29 may include a plurality of longitudinally spaced holes for receiving the snap pins 31, allowing workers to adjust the location of the cross bar supports 15 along the length of the booths 1, 2. A plank or stage 50 may be laid across at least one of the removable cross bar supports 15 and the removable shelf and ladder support 16. The plank or stage 50 may be used as a platform from which workers can more conveniently access overhead structures, such as the ceiling surface from within the containment booth assembly.

Figure 10:
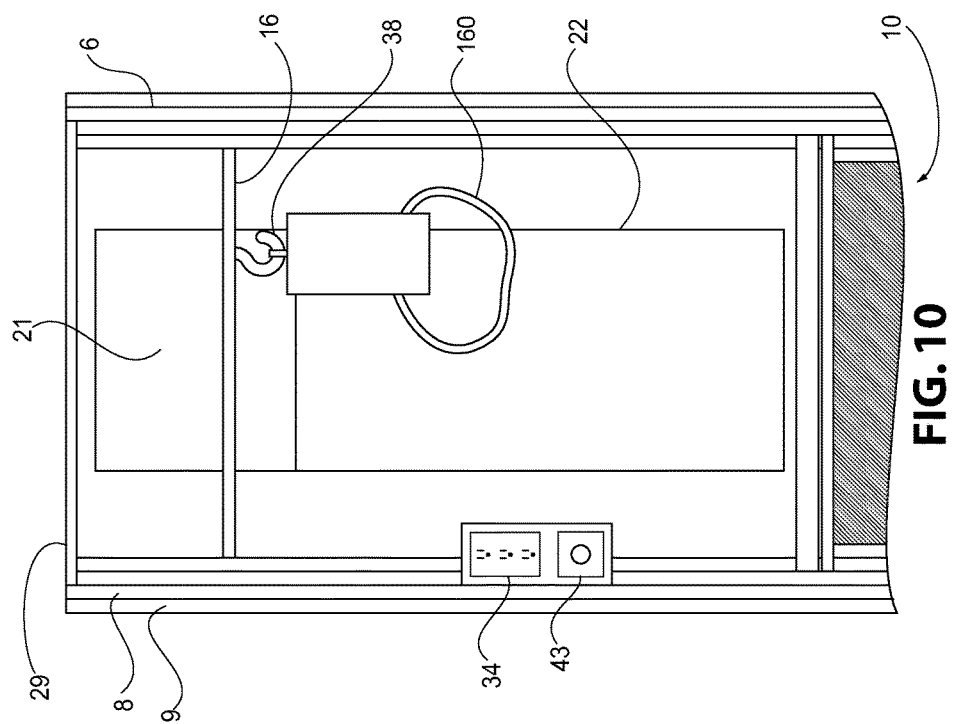
FIG. 10 is a side of an end wall of the containment booth assembly of FIG. 1 viewed from inside the containment booth assembly.

Referring now to FIG. 10, a HEPA fan speed control 43 may be mounted at any suitable location inside the primary booth 1 such that the fan speed control 43 is accessible to workers. For example, the fan speed control 43 may be mounted to any of the vertical support beams 25. The fan speed control 43 facilitates speed adjustment of the primary booth HEPA fan 10 and may include a rotatable dial or other suitable mechanism for receiving input from a worker.

The containment booth assembly may also be equipped with various other components and devices to facilitate the tasks performed by workers with the booth. For example, the booth may include a vacuum support bracket 38 for storing a vacuum cleaner 160 within the booth. The support bracket may be located anywhere in the booth but is preferably conveniently accessible to workers and in a nonintrusive location. For example, the vacuum support bracket 38 may be located underneath the removable shelf and ladder support 16. Further, an electric power strip 34 having one or more 120-volt outlets may be positioned on any of the walls, supports, or beams of the containment booth assembly. In order to reduce the amount of wire routed throughout the containment booth, the electric power strip 34 may be positioned near the fan speed control 43, or the electric power strip 34 may be integral with a panel also containing the fan speed control 43.

It is to be understood that the invention may assume various alternative variations and step sequences, except where expressly specified to the contrary. It is also to be understood that the specific devices and processes illustrated in the attached drawings and described in the specification are simply exemplary embodiments or aspects of the invention.

The containment booth assembly may also be configured such that the secondary booth 2 may be utilized as an anteroom. The primary booth 1 is arranged with the door 3 closed, as shown in FIG. 11. The secondary booth 2 may then be connected to the primary booth 1 in a similar manner as shown in FIG. 1, except that the door 3 provides a barrier between the primary booth 1 and the secondary booth 2. With the booths 1, 2 connected, the door 3 may be opened and closed from within the booths 1, 2 to allow passage between the primary booth 1 and the secondary booth 2. In this configuration, the secondary booth 2 serves as an anteroom, providing a barrier between the clean outside environment and the work area of the primary booth 1. Such a configuration is particularly useful for asbestos removal and in general construction areas.

Although the invention has been described in detail for the purpose of illustration based on what is currently considered to be the most practical and preferred embodiments or aspects, it is to be understood that such detail is solely for that purpose and that the invention is not limited to the disclosed embodiments or aspects but, on the contrary, is intended to cover modifications and equivalent arrangements that are within the spirit and scope thereof. For example, it is to be understood that the present invention contemplates that, to the extent possible, one or more features of any embodiment or aspect can be combined with one or more features of any other embodiment or aspect.

The invention claimed is:

1. A containment booth assembly comprising:
a floor;
a plurality of vertical sidewalls; and
a plurality of sliding panels corresponding to each of the vertical sidewalls,
wherein the plurality of sliding panels defines an extendible top portion, the extendible top portion extendible upwardly and configured to interface with a ceiling surface of a room above the containment booth assembly, and
wherein each of the plurality of sliding panels is separately movable with respect to the other sliding panels.

2. The containment booth assembly of claim 1, wherein one or more of the plurality of vertical sidewalls is rotatably mounted to vertical support beams and defines an extendible side portion,
wherein the extendible side portion is extendible horizontally and configured to interface with a wall surface of the room beside the containment booth assembly.

3. The containment booth assembly of claim 1, further comprising a fan adapted to supply a negative pressure to the containment booth assembly and draw contaminants from the containment booth assembly through a filter.

4. The containment booth assembly of claim 1, wherein a fan and a filter are disposed in one of the plurality of vertical sidewalls.

5. The containment booth assembly of claim 2, wherein the extendible side portion comprises a pair of opposing bifold panels each including a primary panel and a secondary panel hingedly connected to the primary panel,
  wherein the extendible side portion is arrangeable in a retracted position in which the primary panel and the secondary panel of each bifold panel are folded against each other,
  wherein the extendible side portion is further arrangeable in a partially extended position in which the primary panel and the secondary panel of each bifold panel are unfolded perpendicular to each other to define a partially extended footprint of the containment booth assembly, and
  wherein the extendible side portion is further arrangeable in a fully extended position in which the primary panel and the secondary panel of each bifold panel are unfolded parallel to each other and define a fully extended footprint of the containment booth assembly when both secondary panels interface with the wall surface.

6. The containment booth assembly of claim 1, wherein each of the plurality of sliding panels is connected to the corresponding vertical sidewall via one or more constant force springs, the constant force springs biasing the sliding panel in a vertical direction.

7. The containment booth assembly of claim 1, further comprising:
  a secondary booth connectable to a side of the containment booth assembly, the secondary booth comprising:
  a second floor;
  a second plurality of vertical sidewalls; and
  a second plurality of sliding panels corresponding to each of the second vertical sidewalls,
  wherein the second plurality of sliding panels defines a second extendible top portion, the second extendible top portion extendible upwardly and configured to interface with the ceiling surface of the room above the secondary booth.

8. A containment booth assembly, comprising:
  a primary booth including a floor, a plurality of vertical sidewalls, and a plurality of sliding panels corresponding to each of the vertical sidewalls; and
  a secondary booth connectable to the primary booth, the secondary booth including a floor, a plurality of vertical sidewalls, and a plurality of sliding panels corresponding to each of the vertical sidewalls,
  wherein the plurality of sliding panels of the primary booth and the secondary booth defines an extendible top portion, the extendible top portion extendible upwardly and configured to interface with a ceiling surface of a room above the containment booth assembly, and
  wherein the primary booth and the secondary booth each include an openable side, and the primary booth and the secondary booth are configured to be joined at their respective openable sides to form a continuous work area.

9. The containment booth assembly of claim 8, wherein one or more of the plurality of vertical sidewalls of the primary booth and/or the secondary booth is rotatably mounted to vertical support beams and define an extendible side portion,
  wherein the extendible side portion is extendible horizontally and configured to interface with a wall surface of the room beside the containment booth assembly.

10. The containment booth assembly of claim 8, further comprising a fan adapted to supply a negative pressure to the containment booth assembly and draw contaminants from the containment booth assembly through a filter.

11. The containment booth assembly of claim 10, wherein the fan and the filter are disposed in one of the plurality of vertical sidewalls of the primary booth or the secondary booth.

12. The containment booth assembly of claim 9, wherein the extendible side portion comprises a pair of opposing bifold panels each including a primary panel and a secondary panel hingedly connected to the primary panel,
  wherein the extendible side portion is arrangeable in a retracted position in which the primary panel and the secondary panel of each bifold panel are folded against each other,
  wherein the extendible side portion is further arrangeable in a partially extended position in which the primary panel and the secondary panel of each bifold panel are unfolded perpendicular to each other to define a partially extended footprint of the containment booth assembly, and
  wherein the extendible side portion is further arrangeable in a fully extended position in which the primary panel and the secondary panel of each bifold panel are unfolded parallel to each other and define a fully extended footprint of the containment booth assembly when both secondary panels interface with the wall surface.

13. The containment booth assembly of claim 8, wherein each of the plurality of sliding panels is connected to the corresponding vertical sidewall via one or more constant force springs, the constant force springs biasing the sliding panel in a vertical direction.

14. The containment booth assembly of claim 8, further comprising at least one latch provided on a vertical sidewall of at least one of the primary booth and the secondary booth, the at least one latch being configured to join the primary booth and the secondary booth together.

15. A method of establishing a containment area in a room, the method comprising:
  providing a containment booth assembly including:
  a floor;
  a plurality of vertical sidewalls; and
  a plurality of sliding panels corresponding to each of the vertical sidewalls,
  wherein the plurality of sliding panels defines an extendible top portion;
  positioning the containment booth assembly in a desired position in the room; and
  extending the extendible top portion of the containment booth assembly upwardly to interface with a ceiling structure of the room above the containment booth assembly,
  wherein each of the plurality of sliding panels is separately movable with respect to the other sliding panels.

16. The method of claim 15, further comprising:
  extending an extendible side portion of the containment booth assembly horizontally to interface with a wall surface of the room located behind the containment booth assembly.

17. The method of claim 15, further comprising:
  applying a negative pressure through a filter to the containment booth assembly, the negative pressure drawing contaminants from within the containment booth assembly to the filter, preventing the contaminants from entering the room.

18. A containment booth assembly comprising:
  a floor;

a plurality of vertical sidewalls; and
a plurality of sliding panels corresponding to each of the vertical sidewalls,
wherein the plurality of sliding panels defines an extendible top portion, the extendible top portion extendible upwardly and configured to interface with a ceiling surface of a room above the containment booth assembly,
wherein one or more of the plurality of vertical sidewalls is rotatably mounted to vertical support beams and defines an extendible side portion, and
wherein the extendible side portion is extendible horizontally and configured to interface with a wall surface of the room beside the containment booth assembly.

19. A containment booth assembly, comprising:
a primary booth including a floor, a plurality of vertical sidewalls, and a plurality of sliding panels corresponding to each of the vertical sidewalls; and
a secondary booth connectable to the primary booth, the secondary booth including a floor, a plurality of vertical sidewalls, and a plurality of sliding panels corresponding to each of the vertical sidewalls,
wherein the plurality of sliding panels of the primary booth and the secondary booth defines an extendible top portion, the extendible top portion extendible upwardly and configured to interface with a ceiling surface of a room above the containment booth assembly,
wherein one or more of the plurality of vertical sidewalls of the primary booth and/or the secondary booth is rotatably mounted to vertical support beams and define an extendible side portion, and
wherein the extendible side portion is extendible horizontally and configured to interface with a wall surface of the room beside the containment booth assembly.

20. A method of establishing a containment area in a room, the method comprising:
providing a containment booth assembly including:
a floor;
a plurality of vertical sidewalls; and
a plurality of sliding panels corresponding to each of the vertical sidewalls,
wherein the plurality of sliding panels defines an extendible top portion;
positioning the containment booth assembly in a desired position in the room;
extending the extendible top portion of the containment booth assembly upwardly to interface with a ceiling structure of the room above the containment booth assembly; and
extending an extendible side portion of the containment booth assembly horizontally to interface with a wall surface of the room located behind the containment booth assembly.

* * * * *